United States Patent [19]

Iwasa et al.

[11] Patent Number: 4,866,101
[45] Date of Patent: Sep. 12, 1989

[54] RUBBER COMPOSITION FOR PRODUCING SPONGE RUBBER PRODUCT

[75] Inventors: Tadanobu Iwasa, Ichinomiya; Masataka Sasayama, Aichi; Masaki Ohashi, Shizuoka; Isao Kurimoto, Toyonaka, all of Japan

[73] Assignees: Sumitomo Chemical Company, Limited, Osaka, Japan; Toyoda Gosei Co., Ltd., Aichi, Japan

[21] Appl. No.: 317,847

[22] Filed: Mar. 2, 1989

[30] Foreign Application Priority Data

Mar. 8, 1988 [JP] Japan ................................. 63-54040

[51] Int. Cl.$^4$ ............................................. C08J 9/10
[52] U.S. Cl. ........................................ 521/95; 264/54; 521/140; 521/150
[58] Field of Search ....................... 521/140, 95, 150; 264/54

[56] References Cited

U.S. PATENT DOCUMENTS

| | | | |
|---|---|---|---|
| 4,212,787 | 7/1980 | Matsuda et al. | 521/140 |
| 4,247,652 | 1/1981 | Matsuda et al. | 521/140 |
| 4,312,776 | 1/1982 | Puri et al. | 521/95 |
| 4,329,499 | 5/1982 | Horstmann et al. | 521/95 |
| 4,613,524 | 9/1986 | Walles | 521/54 |
| 4,647,498 | 3/1987 | Walles | 521/55 |
| 4,680,317 | 7/1987 | Kuhnel et al. | 521/140 |

*Primary Examiner*—Morton Foelak
*Attorney, Agent, or Firm*—Stevens, Davis, Miller & Mosher

[57] ABSTRACT

A rubber composition for producing sponge rubber products which comprises 1 to 20 parts by weight of a blowing agent and 0.1 to 0.8 part by weight of sulfur relative to 100 parts by weight of an ethylene-α-olefin-non-conjugated dienes tetrapolymer containing as non-conjugated dienes the ethylidene-norbornene component amounting to 15 to 30 in terms of iodine value and the dicyclopentadiene component amounting to 1 to 10 in terms of iodine value and having a branching index of at least 2.

2 Claims, No Drawings

RUBBER COMPOSITION FOR PRODUCING SPONGE RUBBER PRODUCT

FIELD OF THE INVENTION

The present invention relates to a rubber composition for producing sponge rubber products which can be employed for water-proofing, sound insulation, heat insulation, cushioning and like uses for automobiles and the like.

PRIOR ART

Ethylene-α-olefin-non-conjugated diene terpolymers (hereinafter sometimes abbreviated as "EPDM" since the most representative α-olefin is propylene) have excellent properties including thermal resistance, weather resistance and ozone resistance and hence are in wide use for sponge products, particularly for water-proofing or heat insulation sponges such as door seal sponge and trunk seal sponge for automobiles.

These sponge products for automobiles require in one hand good appearance, that is, smooth surface and soft touch and on the other hand, in accordance with recent tendency toward more complicated cross-sectional shape of the products, good shape retention property and dimensional stability in their production. The sponge products are produced in general according to compounding recipes which use 1 to 20 parts by weight of a blowing agent and 1 to 2 parts by weight of sulfur as vulcanizing agent relative to 100 parts by weight of EPDM and through the steps of forming, vulcanization by various methods including continuous vulcanization process, and blowing.

PROBLEMS TO BE SOLVED BY THE INVENTION

The sponge products for automobiles stated above, which are in use for the purpose of water-proofing, sound insulation and the like, are required, as automobiles of higher class are intended, to be improved in the above properties, particularly to show long-term endurance of these characteristics. More specifically, they are required to be excellent in compression set (hereinafter sometimes abbreviated as "C.S."), which is closely related to these characteristics, particularly to give an excellently low C.S. over a long period (hereinafter sometimes abbreviated as "long-term C.S.").

The present invention has been accomplished to solve the above-stated problems and has as its object to provide a composition for producing sponge products which gives an extremely low C.S., particularly a low long-term C.S., and a process for producing the same.

MEANS FOR SOLVING THE PROBLEMS

The present invention relates to a composition for producing sponge rubber products of low long-term compression set which comprises 1 to 20 parts by weight of a blowing agent and 0.1 to 0.8 part by weight of sulfur relative to 100 parts by weight of an ethylene-α-olefin-non-conjugated dienes tetrapolymer containing as non-conjugated dienes the ethylidenenorbornene component (hereinafter sometimes abbreviated as "ENB") amounting to 15 to 30 in terms of iodine value and the dicyclopentadiene component (hereinafter sometimes abbreviated as "DCPD") amounting to 1 to 10 in terms of iodine value and having a branching index of at least 2. The feature of the present invention consists in using a specified EPDM as stated above and using a subtantially smaller amount of sulfur than in prior art rubber compositions for sponge products, namely 0.1 to 0.8 part by weight relative to 100 parts by weight of said EPDM.

So far, it has been known that in the production of non-foam products, namely so-called solid rubber products., C.S. can be decreased by decreasing the amount of sulfur used. In sponge rubber products, however, decreasing the amount of sulfur used causes serious problems before C.S. is improved, that is, the balance between cure rate and blowing rate is lost, resulting in poor surface smoothness of the sponge product or in deterioration of shape retention property, which can cause deformation of the product during vulcanization and blowing; so that such a method has not come to be used in practice.

The present inventors have made extensive studies to obtain a composition for producing sponge rubber products of a low C.S., particularly a low long-term C.S., without causing such problems. As a result, it has been found that an excellent result can be obtained with a smaller amount of compounded sulfur than in the vulcanization of conventional sponge rubber compositions by using EPDM containing specified kinds of non-conjugated dienes in specified proportion and having a specified branching index. The present invention has been attained based on the above finding.

In producing sponge rubber products, it is very important to control the cure rate well balanced with the decomposition rate of blowing agent. The cure rate of DCPD-type EPDM is generally lower than that of ENB-type EPDM and hence DCPD-type EPDM is difficult to balance its cure rate with the decomposition rate of blowing agent. Accordingly, it is not practical to produce sponge rubber by using DCPD-type EPDM alone, and ENB-type EPDM has mainly been used for the purpose.

Furthermore, in a compounding recipe for sponge rubber, the amount of vulcanization accelerator to be used has been required to be strictly controlled to a certain amount in a very narrow range, because even a small weighing error will cause a large fluctuation in the property of sponge, particularly in the expansion ratio and the dimension and shape of sponge products, leading to an unstable production step for sponge products and a high percent reject. This problem can be solved by using as non-conjugated dienes DCPD having a low cure rate in combination with ENB. Using ENB and DCPD in combination also facilitates adjusting the cure rate to a level well balanced with the decomposition rate of blowing agent by selecting the kind and quantity of vulcanization accelerator. Accordingly, the combined use of ENB-type EPDM and DCPD-type EPDM or the use of a tetrapolymer-type EPDM that contains both ENB and DCPD is more favorable than the single use of ENB-type EPDM. Further, since sponge rubber products are more readily affected than solid products by whether the composition used is in well blended state or not, it is more preferable to use a tetrapolymer-type EPDM containing both the ENB and the DCPD components than to use mixture of ENB-type EPDM and DCPD-type EPDM.

Since the amount of sulfur used as vulcanizing agent is small in the present invention, the quality of compounded blend should be strictly maintained at a constant level. Accordingly, it is necessary to use the tetrapolymer-type EPDM, which has a specified component proportion and polymer structure as will be described below.

The tetrapolymer-type EPDMs favorably used in the present invention are those which have a branching index of at least 2, more preferably at least 3. The term "branching index" used herein is an index which signifies the length and quantity of branching or the extent of entanglement of rubber molecules. It is the relative value of the zero shear viscosity of EPDM [$\eta_o$(EPDM)] having an intrinsic viscosity [$\eta$] to the zero shear viscosity of EPM (ethylene-propylene copolymer without non-conjugated diene) [$\eta_o$(EPM)] having substantially no branching and the same intrinsic viscosity [$\eta$], and is defined by the following equation.

Branching index = log ($\eta_o$(EPDM)/$\eta_o$(EPM)) × 10

The zero shear viscosity $\eta_o$ is determined herein with a capillary flow tester at 140° C. The intrinsic viscosity [$\eta$] is determined by conventional method using xylene solution at 70° C.

The tetrapolymer-type EPDM having the above-stated branching index used in the present invention preferably contains ENB amounting to 15 to 30 in terms of iodine value and DCPD amounting to 1 to 10 in terms of iodine value, namely a larger amount of ENB which has a higher cure rate as compared with DCPD, in a fixed proportion in order that the balance between the cure rate and the decomposition rate of blowing agent namely blowing rate, may be kept as well as possible.

Although the most representative of $\alpha$-olefins in the present invention is propylene as described above, other $\alpha$-olefins including butene-1, pentene-1 and hexene-1 may also be used. The weight ratio of ethylene to $\alpha$-olefin preferably used is in the range from 90/10 to 20/80, preferably from 75/25 to 40/60. Although the EPDM to be used has preferably a Mooney viscosity in the range of 80 to 120 in terms of $ML_{1+4}$ 100° C., those having the viscosity outside said range may also be used as required from the viewpoint of compounding and extrusion processability or other factors. The EPDM used in the present invention may also be in the form of oil extended polymer whose viscosity has been reduced by oil extension to facilitate processing, particularly kneading.

Within limits wherein the feature of the present invention of using the tetrapolymer-type EPDM can be retained, 20 to 40% by weight of said tetrapolymer-type EPDM may be replaced by other kinds of EPDM. Further, as occasion demands, other rubbers than EPDM, for example natural rubber, SBR and the like, may be used together with the aim of improving other properties such as adhesive property. When, as stated above, other EPDM or other rubbers are used in combination with the tetrapolymer-type EPDM of the present invention, 1 to 20 parts by weight of a blowing agent and 0.1 to 0.8 part by weight of sulfur should be used based on 100 parts by weight of the total elastomer. When oil extended polymer is used, the quantities of ingredients to be added are calculated on the basis of the weight of base polymer exclusive of extender oil taken as the quantity of rubber used.

The blowing agents used in the present invention are not specifically restricted and are exemplified by nitroso compounds such as N,N'-dinitrosopentamethylenetetramine, azo compounds such as azodicarbonamide and azobisisobutyronitrile, and sulfonyl hydrazide compounds such as p,p'-oxybis(benzenesulfonyl hydrazide) and toluenesulfonyl hydrazide. They are used in an amount of 1 to 20 parts by weight relative to 100 parts by weight of the tetrapolymer-type EPDM of the present invention.

The kind and amount to be used of the blowing agents are selected concretely in consideration of various factors including the expansion ratio of intended sponge products, the balance between blowing rate and cure rate, and temperature conditions for vulcanization and blowing. Two kinds or more of blowing agents may be used together. If necessary, various blowing activators may be used in combination with blowing agents. Sulfur of the vulcanizing agent is used in an amount of 0.1 to 0.8 part by weight relative to 100 parts by weight of the tetrapolymer-type EPDM used in the present invention. When the amount is above said range the long-term C.S. will be high, whereas when it is below said range vulcanization will be incomplete; in both cases, good sponge rubber products cannot be obtained. From the viewpoint of properties of sponge rubber products including surface smoothness and strength, the preferred amount of sulfur to be used is 0.5 to 0.8 part by weight.

The rubber composition used in the present invention may be incorporated with one or more additives selected as desired from carbon black, white fillers, softeners, stabilizer, vulcanization accelerators, processing assistants, pigments and so forth. The rubber composition may be kneaded by a mixer such as a Banbury mixer and open roll. The composition is then molded and worked into sponge rubber products through various continuous vulcanization processes such as HA (Hot Air), PCM (Particle Curing Medium), LCM (Liquid Curing Medium) or UHF (Ultra High Frequency). Vulcanization may also be effected by use of vulcanizing autoclaves.

The present invention will be described below with reference to Examples, but it is not limited thereto

EXAMPLE

Examples 1 and 2, Comparative Example 1

Among the ingredients listed in the following compounding recipe, those from the tetrapolymer-type EPDM down to stearic acid (inclusive) were kneaded together in a BR-type Banbury mixer, then the remaining ingredients were added thereto on a 10-inch roll, the whole was extruded through a 45 mm$\phi$ extruder at 80° C., and then subjected to continuous vulcanization-blowing for 6 minutes in hot air (HA) at 220° C.

| Compounding recipe | (Parts by weight) |
|---|---|
| Tetrapolymer-type EPDM* | 100 |
| FEF Carbon black | 80 |
| Calcium carbonate | 20 |
| Paraffinic oil | 65 |
| Zinc oxide | 5 |
| Stearic acid | 1 |
| Calcium oxide | 5 |
| p,p'-Oxybis(benzenesulfonyl hydrazide) | 3 |
| Zinc di-n-butyldithiocarbamate | 1.2 |
| Dipentamethylenethiuram tetrasulfide | 1.0 |
| Mercaptobenzothiazole | 1.5 |
| N,N'—Dithiobis(morpholine) | 1.0 |
| Sulfur | Varied amount (Table 1) |
| *tetrapolymer-type EPDM | |
| Iodine value | ENB 24, DCPD 3 |
| Branching index | 3.9 |
| Mooney viscosity | $ML_{1+4}$ 100° C. = 110 |

-continued

| Compounding recipe | (Parts by weight) |
| --- | --- |
| Propylene content | 40% by weight |

Form and Size of Extrusion Die

The die is constructed by attaching a tube of 15 mm outside diameter and 11 mm inside diameter onto the upper center part of a ribbon 1 mm thick and 15 mm width to form an integral body.

Methods of Evaluation

(1) Determination of C.S.

Specimens obtained by the method described above were used. A spacer (thickness: $t_2$) was attached such that the percentage of compression would be 50% based on the original height ($t_0$) of the specimen, and the specimen was kept compressed at 70° C. for a predetermined time. After elapse of the predetermined time (shown in Table 1), the specimen was released from pressure and cooled at room temperature for 30 minutes. Thereafter, the height ($t_1$) of the specimen was measured and C.S. was determined according to the following equation.

C.S. (%) = $[(t_0 - t_1)/(t_0 - t_2)] \times 100$

(2) Surface smoothness

This was judged by visual observation. The symbol ○ signifies a good surface smoothness and ⊙ signifies a still better surface smoothness.

(3) Specific gravity

This was determined by the underwater displacement method.

Results of Evaluation

The results obtained in varying the amount of sulfur alone are shown in Table 1. It is recognized that though a larger amount of sulfur is favorable since it gives a somewhat better surface smoothness to the sponge rubber products, an amount outside the range specified in the present invention (1.5 parts by weight of Comparative Example 1) is unfavorable because it results in a lower expansion ratio, higher density and higher C.S., particularly higher long-term C.S.

From the viewpoint of the balance between C.S. and sponge surface smoothness, particularly preferable amount of sulfur to be used is 0.5 to 0.8 part by weight. Sponges using 0.1 to 0.5 part of weight of sulfur are somewhat inferior in appearance but excellent in C.S.; such characteristic can be made the best use of when the sponge is used for automobile parts etc. difficultly visible from outside.

TABLE 1

|  | Example 1 | Example 2 | Comparative Example 1 |
| --- | --- | --- | --- |
| Amount of sulfur (parts by weight) | 0.4 | 0.7 | 1.5 |
| Property of sponge |  |  |  |
| Specific gravity | 0.48 | 0.50 | 0.56 |
| Surface smoothness | ○ | ⊙ | ⊙ |
| C.S. (%) |  |  |  |
| After 22 hrs. | 15 | 15 | 19 |
| After 96 hrs. | 22 | 21 | 29 |
| After 200 hrs. | 27 | 27 | 38 |
| After 400 hrs. | 34 | 32 | 47 |

Examples 3 and 4, Comparative Example 2

Sponge rubber products were prepared by using the same composition as in Example 2 (sulfur: 0.7 part by weight) except that the kind of tetrapolymer-type EPDM was varied. The results of evaluation are shown in Table 2.

The results reveal that when the EPDM used has a branching index outside the range suitable for the present invention, it leads to poor shape retention and surface smoothness. The higher the Mooney viscosity of the polymer used, the better the shape retention property. However, when the polymer has a low branching index of not more than 2, even if it has a high Mooney viscosity, the shape retention property and the sponge surface smoothness are poor and the intended sponge products of good shape can hardly be obtained.

TABLE 2

|  | Example 3 | Example 4 | Comparative Example 2 |
| --- | --- | --- | --- |
| Structural characteristics of tetrapolymer-type EPDM |  |  |  |
| Mooney viscosity (ML$_{1+4}$ 100° C.) | 110 | 95 | 105 |
| Ethylene content (wt %) | 40 | 50 | 45 |
| ENB iodine value | 24 | 25 | 24 |
| DCPD iodine value | 3 | 4 | 4 |
| Branching index | 4.4 | 4.6 | 1.7 |
| Property of sponge |  |  |  |
| Specific gravity | 0.53 | 0.57 | 0.54 |
| Surface smoothness | ⊙ | ○ | ○ |
| Shape retention** (%) | 94 | 89 | 86 |
| Long-term C.S. (%) (70° C., 400 hrs) | 34 | 37 | 35 |

**Shape retention

Relative value of the vertical dimension (B) to the horizontal dimension (A) of the inner diameter of the tube part of the sponge product: (B/A) × 100 (%).

What is claimed is:

1. A rubber composition for producing sponge rubber products which comprises 1 to 20 parts by weight of a blowing agent and 0.1 to 0.8 part by weight of sulfur relative to 100 parts by weight of an ethylene-α-olefin-non-conjugated dienes tetrapolymer containing an non-conjugated dienes the ethylidenenorbornene component amount to 15 to 30 in terms of iodine value and the dicyclopentadiene component amounting to 1 to 10 in terms of iodine value and having a branching index of at least 2.

2. A process for producing sponge rubber products which comprises blending to 20 parts by weight of a blowing agent and 0.1 to 0.8 parts by weight of sulfur relative to 100 parts by weight of an ethylene-α-olefin-non-conjugated dienes tetrapolymer containing as non-conjugated dienes the ethylidenenorbornene component amounting to 15 to 30 in terms of iodine value and the dicyclopentadiene component amounting to 1 to 10 in terms of iodine value and having a branching index of at least 2 and heating the composition to effect vulcanization and blowing.

* * * * *

UNITED STATES PATENT AND TRADEMARK OFFICE
CERTIFICATE OF CORRECTION

PATENT NO. : 4,866,101

DATED : SEPTEMBER 12, 1989

INVENTOR(S) : TADANOBU IWASA ET AL

It is certified that error appears in the above-identified patent and that said Letters Patent is hereby corrected as shown below:

Column 6, line 58 (Claim 2, line 2), after "blending"

insert -- 1 --.

Signed and Sealed this

Twenty-second Day of September, 1992

Attest:

DOUGLAS B. COMER

*Attesting Officer*   *Acting Commissioner of Patents and Trademarks*